(12) United States Patent
Wu et al.

(10) Patent No.: US 8,750,405 B2
(45) Date of Patent: Jun. 10, 2014

(54) MULTI-ANTENNA CODEBOOK SELECTION MODULATION METHOD FOR SOLVING WEAK SCATTERING

(75) Inventors: Zhanji Wu, Beijing (CN); Liling Zhang, Beijing (CN); Wenbo Wang, Beijing (CN)

(73) Assignee: Beijing University of Posts and Telecommunications, Beijing (CN)

(*) Notice: Subject to any disclaimer, the term of this patent is extended or adjusted under 35 U.S.C. 154(b) by 0 days.

(21) Appl. No.: 13/881,580

(22) PCT Filed: Apr. 15, 2011

(86) PCT No.: PCT/CN2011/072896
§ 371 (c)(1),
(2), (4) Date: Jun. 6, 2013

(87) PCT Pub. No.: WO2012/055219
PCT Pub. Date: May 3, 2012

(65) Prior Publication Data
US 2013/0251058 A1 Sep. 26, 2013

(30) Foreign Application Priority Data
Oct. 25, 2010 (CN) .......................... 2010 1 0525877

(51) Int. Cl.
*H04B 7/02* (2006.01)
*H04B 7/06* (2006.01)
*H04B 7/08* (2006.01)

(52) U.S. Cl.
USPC ........... 375/267; 375/299; 375/347; 455/101; 455/132

(58) Field of Classification Search
USPC ......... 375/259, 267, 295, 299, 316, 347, 377; 455/91, 101, 132
See application file for complete search history.

(56) References Cited

U.S. PATENT DOCUMENTS

| 8,428,161 | B2 * | 4/2013 | Sun et al. ...................... 375/260 |
| 2006/0159195 | A1 * | 7/2006 | Ionescu et al. ................ 375/267 |

(Continued)

FOREIGN PATENT DOCUMENTS

| CN | 101394392 A | 3/2009 |
| CN | 101626284 A | 1/2010 |

(Continued)

OTHER PUBLICATIONS

International Search Report issued in PCT/CN2011/072896 mailed Jul. 28, 2011.

*Primary Examiner* — Testfaldet Bocure
(74) *Attorney, Agent, or Firm* — McCarter & English, LLP; Jill Mello (57) ABSTRACT

A multi-antenna codebook selection modulation method for solving weak scattering is provided by the present invention. The method obtains higher diversity gain from a combination of multi-antenna codebook pre-coding and a rotation modulation solution by designing a new codebook selection rule. The present invention employs a design solution of designing a higher-order modulation diversity and space interleaver to obtain the higher diversity gain. In addition, the number of transmission antennas and the number of rotation modulation dimension can be set arbitrarily. However, the present invention takes the number Nt of transmission antennas to be equal to the number D of rotation modulation dimension in order to obtain higher diversity gain. In this way, the method evenly disperses signals of each dimension after D-dimensional rotation to each antenna through space interleaving technique, so that the signals of each dimension suffer different fading, thus enabling space diversity gain. With the present invention, the data of a transmitting end are pre-coded by using a channel value estimated for an ideal channel.

9 Claims, 3 Drawing Sheets

(56) References Cited

U.S. PATENT DOCUMENTS

2007/0140364 A1* 6/2007 Ouyang et al. ............... 375/260
2011/0317541 A1* 12/2011 Liao et al. .................... 370/203
2012/0063530 A1* 3/2012 Nakajima ..................... 375/267
2013/0235828 A1* 9/2013 Sun et al. ..................... 370/329
2013/0251058 A1* 9/2013 Wu et al. ...................... 375/267

FOREIGN PATENT DOCUMENTS

| CN | 101631003 A | 1/2010 |
| CN | 101986587 A | 3/2011 |

* cited by examiner

MULTI-ANTENNA CODEBOOK SELECTION MODULATION METHOD FOR SOLVING WEAK SCATTERING

TECHNICAL FIELD

The invention relates to a modulation method for a digital communication system, and more particularly, to a modulation method which applies to under condition of weak scattering and strong related channel, joint optimization for effectively combining channel code gain, space diversity and modulation diversity by combining multi-antenna codebook pre-coding and a rotation modulation solution via designing a new codebook selection rule. The method based on codebook pre-coding, which belongs to communication technology field, is a modulation method for MIMO system with high efficiency and high frequency using rate.

BACKGROUND OF THE INVENTION

With development of cellular mobile communication. Internet and multimedia service, capacity requirement of wireless communication is increased rapidly in the world, while available frequency spectrum is limited. If the using rate of communication frequency spectrum is not significantly increased, the need of communication capacity can't be satisfied. In a single antenna link system, advanced channel code, for example, Turbo code and low density check code, is used to approach Shannon channel capacity and numbers of antenna of transmitting end and receiving end are increased so as to significantly improve frequency using sate.

Multiple-Input Multiple-Out-put (MIMO) system is a technology which is firstly raised by Marconi in 1908. The MIMO system uses multiple antennas to suppress channel fading. According to the number of antennas of transmitting end and receiving end and compared with normal Single-Input Single-Output (SISO) system, the channel capacity of MIMO is increased linearly with the increasing of number of antennas. That is to say, wireless channel capacity may multiply by using MIMO channel. The frequency using rate can multiply without increasing the bandwidth and antenna transmission power, Pre-coding technology is an important technology of downlink MIMO space reuse in Long Term Evolution (LET) system. The frequency spectrum efficiency of the system can multiply by the space reuse thereof. However the system belongs to interference limited system, thus requiring decreasing interference among antennas and users by using pre-coding technology at She transmuting end so as to Improve throughput of users and system. General pre-coding technology can be classified into two kinds; one kind is non-codebook pre-coding and the other kind is codebook based pre-coding.

In non-codebook pre-coding, a pre-coding matrix is obtained at the transmitting end. The transmitting end uses predicted channel status information to do calculations on the pre-coding matrix, generally, such as singular value decomposition, uniform channel decomposition, and the like. For a codebook based pre-coding system, in a close loop system the pre-coding matrix is obtained at the receiving end. The receiving end selects the pre-coding matrix in a predetermined codebook using the predicted channel status information and feeds the sequence number of the selected pre-coding matrix to the transmitting end; in an open loop TDD system, the transmitting end can use channel reciprocity to obtain an estimated channel response of downlink channel according to uplink pilot, thus selecting a pre-coding codebook used for downlink communication.

In fading channels, diversity becomes particularly important. In condition of optimal diversity, the error probability decreases exponentially as average signal-to-noise ratio increases. At present, bit-interleaved coded modulation (BICM) technology is applied in fading channels by 3GPP and 3GPP LIE. In the BICM, though bit-interleaved modulation makes time diversity degree of code modulation be increased, the performance of anti-fading and anti-interference of bit-interleaved coded modulation is limited since the modulation diversity is not applied. Solving the problem becomes a focus of the industry insiders.

SUMMARY OF THE INVENTION

The purpose of the present invention is solving the problem exist in she prior art and provides a modulation method, which is based on codebook pre-coding, in MIMO system with high efficiency and high frequency spectrum using rate. The method applies to under condition of weak scattering and strong related channel, joint optimization for channel code gain, space diversity and modulation diversity by combining multi-antenna codebook pre-coding and a rotation modulation solution via designing a new codebook selection rule so as to reduce transmission error rate and improves transmission reliability.

The purpose of she present invention is implemented by following technical solution.

A multi-antenna codebook selection modulation method for solving weak scattering, comprising (1) an equivalent channel response of downlink channel being obtained by transmitting pilot signal, a pre-coding matrix being selected according to the equivalent channel response, and a transmitting end obtaining a pre-coding matrix index (PMI);

(2) the transmitting end allocating information with bit length K to each antenna according to requirements of code rate R and code length N of each antenna and performs coding modulation process on the information, then performing D-dimensional rotation modulation process on an in-phase component and a quadrature phase component of a symbol, which is obtained by the coding modulation process, according to a preset rotation angle;

(3) performing layered space interleaving process on signal in path I or path Q on ail Nt antennas after the D-dimensional rotation modulation process respectively;

(4) the transmitting end selecting the pre-coding matrix according to the PMI obtained by step (1), and performing pre-coding operation on a symbol which is processed by layered space interleaving process;

(5) after receiving the data, the receiving end performing pre-decoding process on the data of the receiving end according to the equivalent channel response in step (1);

(6) the receiving end performing layered space de-interleaving process on space-signals in path I or path Q of pre-decoded data on Nr receiving antennas respectively; and performing rotation modulation arid decoding computing on data obtained by the layered space de-interleaving process on each receiving antenna so as to obtain required information; wherein D, Nr and Nt are natural number; the Nt is number of transmitting antennas and Nr is number of receiving antennas.

According another aspect of the invention. Step (1) further comprises (11a) the transmitting end transmitting pilot signal, and the receiving end obtaining channel response H according to the received pilot signal and obtaining equivalent channel response Hv according to codebook collection V;

(12a) calculating detection coefficient matrix $W^H=[(Hv)^H (Hv)+\sigma^2 I_{Nt}]^{-1}(Hv)^H$ according to equivalent channel response Hv so as to obtain signal of the $m^{th}$ antenna of the receiver end obtained by Minimum Mean Squared Error process:

$$r_m = a_{m0}x_0 + a_{m1}x_1 + \ldots + a_{mNt-1}x_{Nt-1} + b_{m0}n_0 + b_{m1}n_1 + \ldots b_{mNr-1}n_{mNr-1} (0 \le m \le Nr-1).$$

therein x represents a signal vector and $x=\{x_0, \ldots x_{Nt-1}\}$, n represents a zero-mean Gaussiasn random variable, squared error is $\sigma^2$, $a_{mn} \in A$, $A=W^H Hv$, A represents a Nt*Nt dimension matrix, $b_{mn} \in B$, $B=W^H$, B represents a Nt*Nr dimension matrix, $I_{Nt}$ represents a Nt*Nt dimension unit matrix;

(13a) According to the signal $r_m$ of the $m^{th}$ antenna at the receiving end obtained by MMSE process in step (12a), the Signal to Interference plus Noise Ratio of each subcarrier signal on the $m^{th}$ antenna at the receiving end being calculated out:

$$SINR_m = \frac{\|a_{mm}\|^2}{\sum_{i \ne m}^{Nt-1} \|a_{mi}\|^2 + \left(\sum_{j}^{Nr-1} \|b_{mj}\|^2\right) * \sigma^2};$$

(14a) According to $SINR_{im}$ of position of each sub-carrier, where $SINR_{im}$ represents corresponding Signal to Interference plus Noise Ratio when the $i^{th}$ codebook is selected on the $m^{th}$ antenna, calculating pre-coding matrix v, i.e.

$$v = \underset{v_i \in V}{\operatorname{argmax}} \; sum(SINR_{i0}, SINR_{i1}, \ldots SINR_{iNt-1})$$

$$i = 1, 2, 3 \ldots,$$

where i represents codebook sequence number;

(15a) Generating the pre-coding matrix index (PMI) according to the pre-coding matrix v and returning the PMI to the transmitting end.

According another aspect of the invention, Step (1) further comprises (11b) the receiving end transmitting uplink pilot detection signal, and thus the transmitting end obtaining uplink channel estimation response H*, and then obtaining downlink channel estimation response H, according to channel reciprocity and obtaining equivalent channel response Hv according to codebook collection V;

(12b) calculating detection coefficient matrix $W^H=[(Hv)^H (Hv)+\sigma^2 I_{Nt}]^{-1}(Hv)H$ according to the equivalent channel response Hv so as to obtain signal of the $m^{th}$ antenna of the receiving end obtained by Minimum Mean Squared Error (MMSE) process:

$$r_m = a_{m0}x_0 + a_{m1}x_1 + \ldots + a_{mNt-1}x_{Nt-1} + b_{m0}n_0 + b_{m1}n_1 + \ldots b_{mNr-1}m_{mNr-1} (0 \le m \le Nr-1);$$

(13b) According to the signal $r_m$ of the $m^{th}$ antenna at the receiving end, obtained by MMSE process in step (12b), the Signal to Interference plus Noise Ratio of each subcarrier signal on the $m^{th}$ antenna at the receiving end being calculated out;

$$SINR_m = \frac{\|a_{mm}\|^2}{\sum_{i \ne m}^{Nt-1} \|a_{mi}\|^2 + \left(\sum_{j}^{Nr-1} \|b_{mj}\|^2\right) * \sigma^2};$$

(14b) According to $SINR_{im}$ of position of each sub-carrier, where $SINR_{im}$ represents corresponding Signal to Interference plus Noise Ratio when the $i^{th}$ codebook is selected on the $m^{th}$ antenna, calculating pre-coding matrix v, i.e.

$$v = \underset{v_i \in V}{\operatorname{argmax}} \; sum(SINR_{i0}, SINR_{i1}, \ldots SINR_{iNt-1})$$

$$i = 1, 2, 3 \ldots$$

i represents codebook sequence number;

(15b) the transmitting end generating a PMI according to pre-coding matrix v and stores the generated PMI.

According another aspect of the invention, Step (3) further comprises (31) the transmitting end performing layered space interleaving process on signals in I path on all Nt transmitting antennas, which includes rearranging positions of symbols after rotation modulation on all Nt transmitting antennas at each point in time according to a set rule, wherein the rule for rearranging is that if the symbol after rotation modulation in I path on the $i^{th}$ antenna at the point in time t before performing layered space interleaving process is $x^i_{It}$ and the symbol after interleaving on the $k^{th}$ antenna at the point in time t after performing layered space interleaving process is $x^k_{It}$, then $x^k_{It}=x^i_{It}$, $k=i+2t+\lfloor t/N \rfloor$) mod Nt, wherein, natural numbers i and k are sequence numbers of transmitting antennas and the value range of both of i and k is [0,Nt–1], the value range of point in time t is 0, 1, . . . , G–1, G represents total number of symbols transmitted by each transmitting antenna, $\lfloor \cdot \rfloor$ represents operation round down, and mod represents modulo operation;

(32) the transmitting end performing layered space interleaving process on symbols (signals) in Q path on all Nt transmitting antennas which includes rearranging positions of symbols after the rotation modulation in Q path on all Nt transmitting antennas at each one point in time according to a set rule, wherein the rule for rearranging is that: if the symbol after the rotation modulation in Q path on the $i^{th}$ antenna at the point in time t before performing the layered space interleaving process is $x^i_{Qt}$, and the symbol after layered space interleaving on the $k^{th}$ antenna at the point in time t after performing layered space interleaving process is $x^k_{Qt}$, then $x^k_{Qt}=x^i_{Qt}$, $k=(i+2t+\lfloor t/N \rfloor)$mod Nt; wherein, natural numbers i and k are sequence numbers of transmitting antennas and the value range of both of i and k is [0,Nt–1], the value range of time t is 0,1 . . . G–1, G represents total number of symbols transmitted by each transmitting antenna, $\lfloor \cdot \rfloor$ represents operation round down, and mod represents modulo operation;

(33) record symbol block vectors of all Nt transmitting antennas interleaved in step (32) as $X=\{x_0, \ldots, x_i, \ldots x_{Nt-1}\}^T$; wherein $x_i$ is a symbol block vector with length G on the $i^{th}$ transmitting antenna, natural number t is a sequence number of transmitting antenna, the value range of i is [0,Nt–1], and the number of transmitting antennas and the modulation dimension number can be set arbitrarily in principle, however, full diversity gain can be realized when the number of antennas Nt is equal to number of dimension D.

According another aspect of the invention, wherein Step (2) further comprises (21) Calculating bit number on each antenna according to formula K=N×R;

(22) Performing coding modulation on the K bits information on each antenna;

(23) Performing D-dimensional rotation modulation process on the modulated symbol, which includes setting a rotation matrix RM, the signal vector after rotation modulation $x=(x_0, x_i, \ldots x_{G-1})$, which satisfies x=RM×u, wherein x is a signal vector after rotation modulation which includes G signals, and u is a signal vector before rotation;

(24) Storing respective symbol block vectors obtained after performing rotation modulation.

According another aspect of the invention, Step (4) further comprises (41) setting symbol block vectors of all Nt transmitting antennas after layered space interleaving process in step (3) as the following: $X=\{x_0, \ldots x_i, \ldots, x_{Nt-1}\}^T$, wherein $x_i$ represents symbol block vector with length G on the $i^{th}$ transmitting antenna, and the value range of i is [0,Nt−1];

(42) selecting a corresponding codebook according to the PMI obtained in step (1) and taking the selected codebook as pre-coding matrix v; then multiplying v by symbol block vector X to obtain symbol block Z which is generated by the pre-coding process and has the same length as symbol block vector X, and $Z=vX=\{Z_0, \ldots Z_i, \ldots, Z_{Nt-1}\}^T$, wherein $Z_i$ is the pre-coded symbol block vector on the $i^{th}$ antenna.

According another aspect of the invention, Step (5) further comprises (51) setting symbol block vectors received by all Nr receiving antennas at the receiving end as $y=\{y_0, \ldots y_j, \ldots, y_{Nr-1}\}^T$, wherein, $y_j$ represents the symbol block vector received by the $j^{th}$ receiving antenna and j represents sequence number of receiving antenna, of which the value range is [0,Nr−1];

(52) pre-decoding the obtained symbol block vector $y=\{y_0, \ldots y_j, \ldots, y_{Nr-1}\}^T$ to obtain pre-decoded signal.

According another aspect of the invention, Step (52) further comprises (521) the receiving end obtaining channel response H according to the received pilot signal and obtaining equivalent channel response Hv according to codebook collection V;

(522) computing a detection coefficient matrix $W^H$ according to the equivalent channel response Hv, wherein $$W^H=[(Hv)^H(Hv)+\sigma^2 I_{Nt}]^-(Hv)^H.$$

(523) multiplying by $a^*_{mm}/|a_{mm}|$ to perform phase compensation on signal $r_m$ suffered MMSE, and make the output signal is in form of $r_m=|a_{mm}|x_m+(a^*_{mm}/|a_{mm}|)(a_{m0}x_0+a_{m1}x_1+\ldots+a_{m(m-1)}x_{m-1}+a_{m(m+1)}x_{m+1}+\ldots+a_{mNt-1}x_{Nt-1}+b_{m0}n_0+b_{m1}n_1+\ldots b_{mNt-1}n_{mNr-1})$;

wherein a* represents conjugation of a, | | represents modulo operation.

According another aspect of the invention, Step (6) further comprises (61) the receiving end firstly performing space de-interleaving on the pre-coded signals in path I or Q on all Nr receiving antennas: rearranging real part and imaginary part of the symbol block vectors on the receiving antenna respectively, wherein the rule of rearranging includes setting the symbol block vector of the $j^{th}$ receiving antenna before rearranging to be $(x^j_{It}, x^j_{Qt})$; and signals of the real part and the imaginary part on the $k^{th}$ receiving antenna after rearranging satisfying following formula:

$x^k_{It}=x^j_{It}, k=(j-2t-\lfloor 2 t/Nr \rfloor)\mod Nr$ $x^k_{Qt}=x^j_{Qt}, k=(j-2t-\lfloor 2 t/Nr \rfloor-1)\mod Nr;$ wherein, mod represents modulo operation, $\lfloor \rfloor$ represents operation round down $x^k_{It}$ represents signal of real part after de-interleaving, and $x^k_{Qt}$ represents signal of imaginary part after de-interleaving.

(62) performing rotation demodulation process on symbol of each antenna by using maximum likelihood demodulation, taking a rotation constellation diagram undergone fading channel as a demodulation referencing constellation diagram, and by computing Euclidean distance between each symbol of the received data symbol and each constellation point in its modulating referencing constellation diagram, obtaining log-likelihood ratios for decoding which are mapped as respective bits of each symbol;

(63) restoring the data block symbol on each antenna to be bit information with code length of N and then perform decoding operation, selecting a corresponding decoding way according to the coding-way and then using it to restore every group of user data block symbol on each antenna to be information bits with K bit.

The advantage of the present invention at least includes that the multi-antenna codebook selection modulation method jointly optimize channel code gain, time diversity, space diversity and modulation diversity by combining multi-antenna codebook pre-coding and a rotation modulation solution by designing a new codebook selection rule, thus reducing transmission error rate and improving transmission reliability,

BRIEF DESCRIPTION OF THE DRAWINGS

FIGS. 2(a) and (b) shows comparison of constellation diagrams before rotation modulation and after rotation modulation;

DETAILED DESCRIPTION OF THE INVENTION

Further description of the present invention will be illustrated, which combined with drawings and embodiments.

The present invention is a rotation modulation method for MIMO system. The method applies to, under condition of weak scattering related channel, joint optimization of channel code gain, space diversity and modulation diversity by combining multi-antenna codebook pre-coding (pre-coding using codebook for multi-antenna situation) and a rotation modulation solution via designing a new codebook selection rule, thus reducing transmission error rate and Improving transmission reliability.

Figure 1:
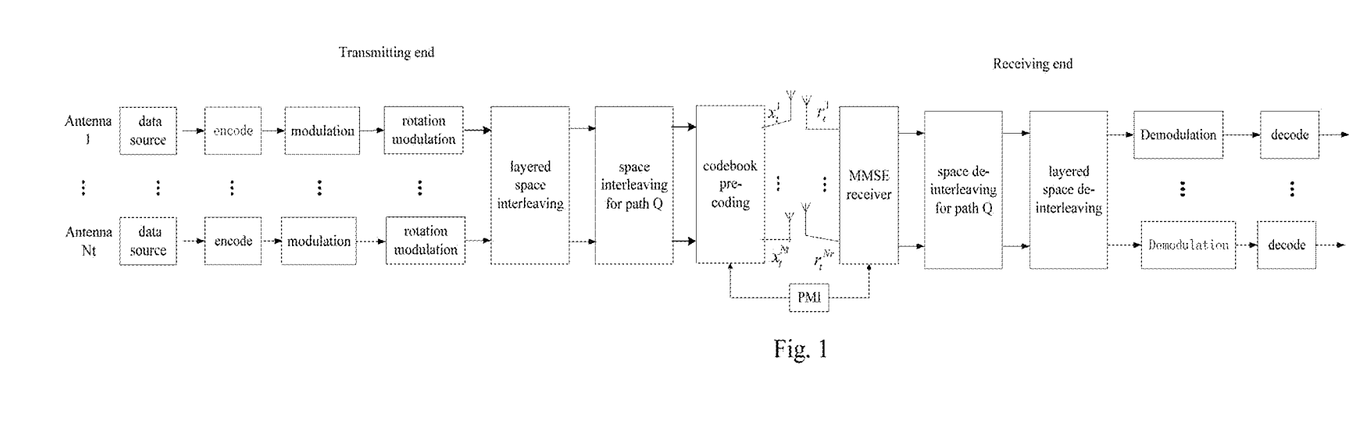
FIG. 1 shows a flowchart of a muiti-antenna codebook selection modulation method used in a Ml MO system.

Referring to FIG. 1, a multi-antenna codebook selection modulation method used in a MIMO system of this embodiment is introduced. The method includes following operation steps.

(1) an equivalent channel response of downlink channel is obtained by transmitting pilot signal, a pre-coding matrix is selected according to the equivalent channel response, and a transmitting end obtains a pre-coding matrix index(PMI);

(2) The transmitting end allocates information with bit length K to each antenna according to requirements of code rate R and code length N of each antenna and performs coding modulation process on the information; then perform D-dimensional rotation modulation process on an in-phase component and a quadrature-phase component of a symbol, which is obtained by the coding modulation process, according to a preset rotation angle; and then stores the symbol (data block) after the D-dimensional rotation modulation;

(3) performing layered space interleaving process on signal in path I or path Q on all Nt antennas respectively; the number of the antennas and modulation dimension number can be arbitrarily set in principle; preferably, when the number of antennas Nt and modulation dimension number D are equal, full diversity gain can be realized;

(4) The transmitting end selects the pre-coding matrix according to the PMI obtained by step (1), performs pre-coding operation on a symbol block vector which is processed by layered space interleaving process and stores the pre-coded symbol block vector;

(5) after receiving the data, the receiving end performs pre-decoding process on the data of the receiving end according to the equivalent channel response in step (1);

(6) the receiving end performs layered space de-interleaving process on space signals in path I or Q of pre-decoded data on Nr receiving antennas respectively; and performs rotation modulation and decoding computing on data obtained by the layered space de-interleaving process on each, receiving antenna so as to obtain required data bit information.

Based on the above modulation solution of the present invention, the main designing features of the present invention of the multi-antenna codebook selection modulation method used in the MIMO system lie in: by using rotation modulation technology and space-time interleaves signals are evenly distributed among antennas as far as possible; further, a new codebook selection rule is designed in step (3) of the present invention, which combines the multi-antenna codebook pre-coding and the rotation modulation solution to obtain higher diversity gain.

The advantages of the MIMO technology and rotation modulation technology include that, the rotation modulation constellation diagram introduces signal diversity gain, the space interleaver makes the in-phase component (I) and the quadrature-phase component (Q), which are generated in process of transmitting sent symbol, to be transmitted independently and eliminates the relativity of fading coefficients of sent signal I and sent signal Q as far as possible. Combination of modulation diversity and the space interleaver is the key of obtaining the diversity gain. Higher order modulation diversity and space interleaver are used in the present invention so as to obtain higher diversity gain.

In addition, in order to obtain higher space diversity gain, space layered interleaver combined with multi-dimensional rotation modulation are designed in step (3) of the present invention; especially, when the modulation dimension number equals to the number of transmitting antennas, diversity gain can be maximized. For example, two-dimensional rotation modulation is used for a 2*2 system; four-dimensional rotation modulation is used for a 4*4 system; higher order is in the similar way. After D-dimensional rotation, signals of respective dimensions by space interleaves technology are evenly distributed to respective antennas in such way that signals for respective dimension suffer different fading and space diversity gain is realized. Pre-coding process on data at the transmitting end is performed with channel value estimated by ideal channel.

In step (1) of the present invention, the process that the system makes the transmitting end obtain PMI by sending pilot signal can be realized in a close loop system and can also be realized in an open loop TDD (Time Division Duplex) system. Specific steps of process that the transmitting end obtains PMI by sending pilot signal in the two kinds of system are as the following.

In the close loop system, step (1) further includes following operation steps:

(11a) the transmitting end transmits pilot signal; the receiving end obtains channel response H according to the received pilot signal and obtains equivalent channel response Hv according to codebook collection V.

The embodiment of the present invention applies single-user double-stream signal codebook collection (code-book collection for single-user double-stream signal MIMO scheme) regulated in protocol 36.211:

$$V = \left\{ \begin{pmatrix} 1 & 0 \\ 0 & 1 \end{pmatrix}, \frac{1}{\sqrt{2}}\begin{pmatrix} 1 & 1 \\ 1 & -1 \end{pmatrix}, \frac{1}{\sqrt{2}}\begin{pmatrix} 1 & 1 \\ j & -j \end{pmatrix} \right\}$$

(12a) calculate detection coefficient matrix $W^H = [(Hv)^H (Hv) + \sigma^2 I_{Nt}]^{-1}(Hv)^H$ according to equivalent channel response Hv so as to obtain signal of the $m^{th}$ antenna of the receiver end obtained by Minimum Meat; Squared Error (MMSE) process:

$$r_m = a_{m0}x_0 + a_{m1}x_1 + \ldots + a_{mNt-1}x_{Nt-1} + b_{m0}n_0 + b_{m1}n_1 + \ldots b_{mNr-1}n_{mNr-1} (0 \le m \le Nr-1)$$

therein x represents a signal vector and $x = \{x_0, \ldots x_{Nt-1}\}$, n represents a zero-mean Gaussian random variable, squared error is $\sigma^2$, $a_{mn} \in A$, $A = W^H Hv$, A represents a Nt*Nt dimension matrix, $b_{mn} \in B$. $B = W^H$, B represents a Nt*Nr dimension matrix, $I_{Nt}$ represents a Nt*Nt dimension unit matrix, Nt is number of transmitting antennas and Nr is number of receiving antennas.

For a subcarrier of each frequency domain, its detection coefficient matrix can be calculated out, i.e. $W^H = [(Hv)^H (Hv) + \sigma^2 I_{Nt}]^{-1} Hv^B$; receiving signal is y=Hvx+n; x represents a signal vector and $x = \{x_0, \ldots x_{Nt-1}\}$; n is a zero-mean Gaussian random variable; square error is $\sigma^2$, $y = \{y_0, \ldots y_{Nt-1}\}$. Multiply the received signal y with the detection coefficient matrix to obtain $r = W^H y = Ax + Bn$; $r = \{r_0 \ldots r_{Nr-1}\}$ is signal processed by a MMSE receiver. Therein, $A = W^H Hv$, $B = W^H$. A is a Nt*Nt dimension matrix; $a_{mn} \in A$; B is a Nt*Nr dimension matrix. $I_{Nt}$ is a Nt*Nt dimension unit matrix; $b_{mn} \in B$. For each subcarrier on the receiving antenna m, signal processed by MMSE is ($0 \le m \le Nr-1$):

$$r_m = a_{m0}x_0 + a_{m1}x_1 + \ldots + a_{mNt-1}x_{Nt-1} + b_{m0}n_0 + b_{m1}n_1 + \ldots b_{mNr-1}n_{mNr-1}.$$

(13a) According to the signal $r_m$ of the $m^{th}$ antenna at the receiving end obtained by MMSE process in step (12a), the Signal to Interference plus Noise Ratio of each subcarrier signal on the $m^{th}$ antenna at the receiving end is calculated out:

$$SINR_m = \frac{\|a_{mm}\|^2}{\sum_{i \ne m}^{Nt-1} \|a_{mi}\|^2 + \left(\sum_{j}^{Nr-1} \|b_{mj}\|^2\right) * \sigma^2};$$

Here, for convenience of illustration, we suppose that the transmission powers of respective antennas at the transmitting end are equal, i.e. influence of power allocation to the Signal to Interference plus Noise Ratio is not considered, in such way that the calculation formula of the above Signal to interference plus Noise Ratio is calculated out.

(14a) According to $SINR_{im}$ of position of each sub-carrier, where $SINR_{im}$ represents corresponding Signal to Interference plus Noise Ratio when the $i^{th}$ codebook is selected on the $m^{th}$ antenna, calculate pre-coding matrix v. i.e.

$$v = \underset{v_i \in V}{\mathrm{argmax}}\ sum(SINR_{i0}, SINR_{i1}, \ldots SINR_{iN_t-1})$$
$$i = 1, 2, 3 \ldots$$

In the formula, 1 represents codebook sequence number.

Here, maximum average SINR rule is used for selecting pre-coding matrix v. each sub-carrier position has Nt Signal to Interference plus Noise Ratios, Calculate sum of Signal to Interference plus Noise Ratios on each antenna, i.e. sum $(SINR_{i0}, SINR_{i1} \ldots SINR_{iN_t-1}) = SINR_{i0} + SINR_{i1} + \ldots SINR_{iN_t-1}$. Corresponding to each codebook, a $sum(SINR_{i0}, SINR_{i1} \ldots SINR_{iN_t-1})$ can be obtained. Then select pre-coding matrix v which makes $$v = \underset{v_i \in V}{\mathrm{argmax}}\ sum(SINR_{i0}, SINR_{i1}, \ldots, SINR_{iN_t-1})$$
$$i = 1, 2, 3 \ldots,$$

where i represents codebook sequence number. That is to say, the codebook selected for each sub-carrier should maximize the sum of Signal to Interference plus Noise Ratios corresponding to signals on respective antennas at the position of the sub-carrier. Of course, in the codebook selection, one sub-carrier can correspond to one codebook; or a group of subcarriers can correspond to one codebook, and In this case, the rule should be calculating the sum of Signal to Interference plus Noise Ratios corresponding to subcarriers of all positions in the group and selecting the codebook which makes the sum to be maximize as the pre-coding codebook.

(15a) Generate the pre-coding matrix index (PMI) according to the pre-coding matrix v and return the PMI to the transmitting end, In an open TDD system, step(l) further includes following operation steps:

(11b) the receiving end transmits uplink pilot detection signal, and thus the transmitting end obtains uplink channel estimation response H*, and then obtains downlink channel estimation response H, i.e. conjugate transpose of H* according to channel reciprocity and obtains equivalent channel response Hv according to codebook collection V.

(12b) calculate detection coefficient matrix $W^H = [(Hv)^H (Hv) + \sigma^2 I_{Nt}]^{-1}(Hv)H$ according to the equivalent channel response Hv so as to obtain signal of the $m^{th}$ antenna of the receiving end obtained by Minimum Mean Squared Error (MMSE) process;

$r_m = a_{m0}x_0 + a_{m1}x_1 + \ldots + a_{mN_t-1}x_{N_t-1} + b_{m0}n_0 + b_{m1}n_1 + \ldots b_{mN_r-1}n_{mN_r-1} (0 \le m \le N_r-1)$ Therein, x represents a signal vector and $x = \{x_0, \ldots x_{N_t-1}\}$, n represents a zero-mean Gaussiasn random variable, squared error is $\sigma^2$, $a_{mn} \in A$, $A = W^B Hv$, A represents a Nt*Nt dimension matrix, $b_{mn} \in B$, $B = W^H$, B represents a Nr*Nr dimension matrix, $I_{Nt}$ represents a Nt*Nt dimension unit matrix, Nt is number of transmitting antennas and Nr is number of receiving antennas.

For a subcarrier of each frequency domain, its detection coefficient matrix can be calculated out, i.e. $W^H = [(Hv)^H (Hv) + \sigma^2 I_{Nt}]^{-1}(Hv)^B$; receiving signal is $y = Hvx + n$; x represents a signal vector and $x = \{x_0, \ldots x_{N_t-1}\}$; n is a zero-mean Gaussiasn random variable; square error is $\sigma^2$, $y = \{y_0, \ldots y_{N_t-1}\}$. Multiply received signal y by the detection coefficient matrix to obtain $r = W^H y = Ax + Bn$; $r = \{r_0 \ldots r_{N_r-1}\}$ is signal processed by a MMSE receiver. Therein, $A = W^H Hv$, $B = W^B$. A is a Nt*Nt dimension matrix; $a_{mn} \in A$; B is a Nt*Nr dimension matrix, $I_{Nt}$ is a Nt*Nt dimension unit matrix; $b_{mn} \in B$. For each subcarrier on the receiving antenna m, signal processed by MMSE is $(0 \le m \le Nr-1)$:

$r_m = a_{m0}x_0 + a_{m1}x_1 + \ldots + a_{mN_t-1}x_{N_t-1} + b_{m0}n_0 + b_{m1}n_1 + \ldots b_{mN_t-1}n_{mN_t-1}.$ (13b) According to she signal $r_m$ of the $m^{th}$ antenna at the receiving end, obtained by MMSE process in steps (12b), the Signal to Interference plus Noise Ratio of each subcarrier signal on the $m^{th}$ antenna at the receiving end is calculated out:

$$SINR_m = \frac{\|a_{mm}\|^2}{\sum_{i \ne m}^{N_t-1} \|a_{mi}\|^2 + \left(\sum_{j}^{N_r-1} \|b_{mj}\|^2\right) * \sigma^2};$$

(14b) According to $SINR_{im}$ of position of each sub-carrier, where $SINR_{im}$ represents corresponding Signal to Interference plus Noise Ratio when the $i^{th}$ codebook is selected on the $m^{th}$ antenna, calculate pre-coding matrix v, i.e.

$$v = \underset{v_i \in V}{\mathrm{argmax}}\ sum(SINR_{i0}, SINR_{i1}, \ldots, SINR_{iN_t-1})$$
$$i = 1, 2, 3 \ldots,$$

i represents codebook sequence number.

Here, maximum average SINR rule is used for selecting pre-coding matrix v; each sub-carrier position has Nt Signal to Interference plus Noise Ratios; calculate sum of Signal to Interference plus Noise Ratios on each antenna, i.e. Sum $(SINR_{i0}, SINR_{i1} \ldots SINR_{iN_t-1}) = SINR_{i0} + SINR_{i1} + \ldots SINR_{iN_t-1}$. Corresponding to each codebook, a $sum(SINR_{i0-}, SINR_{i1} \ldots SINR_{iN_t-1})$ can be obtained; then select pre-coding matrix v which makes $$v = \underset{v_i \in V}{\mathrm{argmax}}\ sum(SINR_{i0}, SINR_{i1}, \ldots, SINR_{iN_t-1})$$
$$i = 1, 2, 3 \ldots,$$

i represents codebook sequence number. That is to say, the codebook selected for each sub-carrier should maximize the sum of Signal to Interference plus Noise Ratios corresponding to signals on respective antennas at the position of the sub-carrier. Of course, in the codebook selection, one sub-carrier can correspond to one codebook; or a group of sub-carriers can correspond to one codebook, and in this ease, the rule should he calculating the sum of Signal to interference plus Noise Ratios corresponding to subcarriers of all positions in the group and selecting the codebook which makes the sum to be maximize as the pre-coding codebook, (15b) the transmitting end generates a PMI according to pre-coding matrix v and stores the generated PMI.

Step (2) further includes following operation steps:

(21) calculate bit number on each antenna according to formula $K = N \times R$;

In the embodiment of the present invention, N=2304, R=8/9; therefore, the bit number K=2048 on each antenna;

(22) perform coding modulation on the K bits information on each antenna;

In the embodiment of the present invention, Turbo decoding is used; coding modulation is performed on the K bits information by Quadrature Phase Shift Keying (QPSK) modulation and obtain Ns modulated symbols, where Ns=1024;

(23) perform D-dimensional rotation modulation process on the modulated symbol: set a rotation matrix RM, the signal vector after rotation modulation $x=(x_0, x_1, \ldots, x_{G-1})$, which satisfies $x=RM \times u$, wherein x is a signal vector after rotation modulation which includes G signals, and u is a signal vector before rotation;

Two-dimensional rotation modulation is taken as an example:

$$RM = \begin{pmatrix} \cos\theta & \sin\theta \\ -\sin\theta & \cos\theta \end{pmatrix},$$

θ is a set rotation angle and its value range is [0, π/2]; set a modulation symbol before two-dimensional rotation modulation process to be $u_i = A + Bj$, wherein A is called in-phase component of $u_i$, B is called the quadrature-phase component of $u_i$; the symbol processed by two-dimensional rotation modulation is $x_i X + Yj$, then $$\begin{pmatrix} X \\ Y \end{pmatrix} = RM \times \begin{pmatrix} A \\ B \end{pmatrix},$$

i.e. $\begin{pmatrix} X \\ Y \end{pmatrix} = \begin{pmatrix} \cos\theta & \sin\theta \\ -\sin\theta & \cos\theta \end{pmatrix} \begin{pmatrix} A \\ B \end{pmatrix}$;

For four-dimensional rotation modulation, a four-dimensional modulation symbol consists of in-phase components and quadrature-phase components of two neighbored modulation symbols, i.e. in one time of rotation modulation processes, four components, i.e. in-phase components and quadrature-phase components of two neighbored modulation symbols are processed; therefore, set two modulation symbols before performing four-dimensional rotation modulation process are respectively to he A+Bj and C+Dj, after four-dimensional rotation modulation, values corresponding to the two modulation symbols are X+Yj and Z+Wj, then $$\begin{pmatrix} X \\ Y \\ Z \\ W \end{pmatrix} = RM \times \begin{pmatrix} A \\ B \\ C \\ D \end{pmatrix},$$

where $RM = \begin{pmatrix} \cos\theta_1\cos\theta_2 & \sin\theta_1\cos\theta_2 & \cos\theta_1\sin\theta_2 & \sin\theta_1\sin\theta_2 \\ -\sin\theta_1\cos\theta_2 & \cos\theta_1\cos\theta_2 & -\sin\theta_1\sin\theta_2 & \cos\theta_1\sin\theta_2 \\ -\cos\theta_1\sin\theta_2 & -\sin\theta_1\sin\theta_2 & \cos\theta_1\cos\theta_2 & \sin\theta_1\cos\theta_2 \\ \sin\theta_1\sin\theta_2 & -\cos\theta_1\sin\theta_2 & -\sin\theta_1\cos\theta_2 & \cos\theta_1\cos\theta_2 \end{pmatrix}.$ $\theta_1$ and $\theta_2$ are set rotation angles, of which the value range is [0, π/2].

Figure 2:
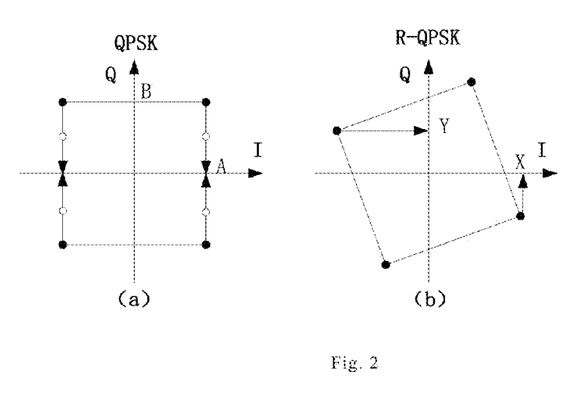

Referring to FIG. 2, Quadrature Phase Shift Keying (QPSK) modulation is taken as an example for illustrating comparison of constellation diagrams before and after rotation modulation. Because QPSK maps every two bits of data to be one symbol; there are total four possible bit combinations and corresponding symbol values. FIG. 2(a) shows a gray mapping constellation diagram of general modulation, where A and B are projections of respective constellation points on real part and imaginary part. Projection values of four constellation points in FIG. 2(a) on the real part and imaginary part can be $$\pm \frac{\sqrt{2}}{2};$$

FIG. 2(b) is a constellation diagram which is formed by performing θ degree of rotation modulation on FIG. 2(a); value of X and value of Y are projections of respective constellation points after the rotation modulation; after the rotation modulation, values of constellation points determined by value X and Value Y are equivalent to the result of making FIG. 2(a) to be clockwise rotated with θ degree.

In the embodiment of she present invention, value of θ for the two-dimensional rotation QPSK modulation is θ=arc tan (1/2)=0.4636 (radian); set the symbol before rotation modulation to be A+Bj and the symbol after rotation modulation to be X+Yj, then the symbol after rotation QPSK modulation can be obtained according to $$\begin{pmatrix} X \\ Y \end{pmatrix} = \begin{pmatrix} 0.8944 & 0.4472 \\ -0.4472 & 0.8944 \end{pmatrix} \begin{pmatrix} A \\ B \end{pmatrix}.$$

Value of θ for apply 16 QAM may be θ=arc tan(1/3)=0.3218 (radian); value of θ for apply 64 QAM may be θ=arc tan(1/4)=0.245 (radian);

As to four-dimensional rotation, Value of $\theta_1$ and $\theta_2$ for four-dimensional rotation QPSK modulation may be $\theta_1=\theta_2$=arc tan(1/2)+0.4636 (radian), for 16 QAM may be $\theta_1=\theta_2$=arc tan(1/3)=0.3218(radian) and for 64 QAM may be $\theta_1=\theta_2$=arc tan(1/4)=0.245 (radian); Therefore following rotation modulation matrix can be obtained:

| Way of modulation | Rotation angle $\theta = \theta_1 = \theta_2$ | Two-dimensional rotation matrix | Four-dimensional rotation matrix |
|---|---|---|---|
| QPSK | arctan (1/2) | $\begin{pmatrix} 0.8944 & 0.4472 \\ -0.4472 & 0.8944 \end{pmatrix}$ | $\begin{pmatrix} 0.8 & 0.4 & 0.4 & 0.2 \\ -0.4 & 0.8 & -0.2 & 0.4 \\ -0.4 & -0.2 & 0.8 & 0.4 \\ 0.2 & -0.4 & -0.4 & 0.8 \end{pmatrix}$ |

-continued

| Way of modulation | Rotation angle $\theta = \theta_1 = \theta_2$ | Two-dimensional rotation matrix | Four-dimensional rotation matrix |
|---|---|---|---|
| 16QAM | arctan (1/3) | $\begin{pmatrix} 0.9487 & 0.3162 \\ -0.3162 & 0.9487 \end{pmatrix}$ | $\begin{pmatrix} 0.9 & 0.3 & 0.3 & 0.1 \\ -0.3 & 0.9 & -0.1 & 0.3 \\ -0.3 & -0.1 & 0.9 & 0.3 \\ 0.1 & -0.3 & -0.3 & 0.9 \end{pmatrix}$ |
| 64QAM | arctan (1/4) | $\begin{pmatrix} 0.9701 & 0.2425 \\ -0.2425 & 0.9701 \end{pmatrix}$ | $\begin{pmatrix} 0.9412 & 0.2352 & 0.2352 & 0.0588 \\ -0.2352 & 0.9412 & -0.0588 & 0.2352 \\ -0.2352 & -0.0588 & 0.9412 & 0.2352 \\ 0.0588 & -0.2352 & -0.2352 & 0.9412 \end{pmatrix}$ |

(24) store respective symbol block vectors obtained after performing rotation modulation.

Step (3) further includes following operation steps;

(31) the transmitting end performs layered space interleaving process on symbols (signals) in I path on all Nt transmitting antennas, which includes rearranging positions of symbols after rotation modulation on all Nt transmitting antennas at each point In time according to a set rule; the rule for rearranging is that if the symbol after rotation modulation in I path on the $i^{th}$ antenna at the point in time t before performing layered space interleaving process is $x^1_{It}$, and the symbol after interleaving on the $k^{th}$ antenna at the point in time t after performing layered space interleaving process Is $x^k_{It}$, then $x^k_{It}=x^1_{It}$, k=(i+2t+$\lfloor 2 t/N \rfloor$) mod Nt; in the formula, natural numbers i and k are sequence numbers of transmitting antennas and the value range of both of i and k is [0,Nt−1]; the value range of point in time t is 0, 1, ..., G−1; G represents total number of symbols transmitted by each transmitting antenna; $\lfloor \rfloor$ represents operation round down; mod represents modulo operation;

(32) the transmitting end performs layered space interleaving process on symbols (signals) in Q path on ail Nt transmitting antennas which includes rearranging positions of symbols after the rotation modulation in Q path on all Nt transmitting antennas at each one point in time according to a set rule; the rule for rearranging is that if the symbol after the rotation modulation in Q path on the $i^{th}$ antenna at the point in time t before performing the layered space interleaving process is $x^1_{Qt}$, and the symbol after layered space interleaving on the $k^{th}$ antenna at the point in time t after performing layered space interleaving process is $x^k_{Qt}$, then $x^k_{Qt}=x^i_{Qt}$, k=(i+2t+$\lfloor 2 t/N \rfloor$) mod Nt; in the this formula, natural numbers i and k are sequence numbers of transmitting antennas and the value range of both of i and k is [0,Nt−1]; the value range of time t is 0,1, ..., G−1; G represents total number of symbols transmitted by each transmitting antenna; $\lfloor \rfloor$ represents operation round down; mod represents modulo operation;

(33) recombine the interleaved signal to obtain signal ($x^k_{It}$, $x^k_{Qt}$); record symbol block vectors of ail Nt transmitting antennas as X={$x_0$, ... $x_i$, ... $x_{Nt-1}$}$^T$; In the formula, $x_i$ is a symbol block vector with length G on the $i^{th}$ transmitting antenna; natural number I is a sequence number of transmitting antenna, of which the value range is [0,Nt−1]; the number of transmitting antennas and the modulation dimension number can be set arbitrarily in principle; however, full diversity gain can be realised when the number of antennas Nt is equal to number of dimension D.

In the embodiment of the present invention, four-dimensional modulation and four antennas are taken as an example for introducing application of combination of high order rotation modulation and space interleaving. In the four-dimensional rotation modulation, one time of rotation modulation processes four components, i.e. in-phase components and the quadrature-phase components of two neighbored modulation symbols; therefore the effect of space interleaving is that four components are scattered on four antennas and each component undergoes different channel fading.

According to the above formula, rearranging formula for I path becomes:

$x^k_{It}=x^i_{It}$, k=(i+2t+$\lfloor 2 t/4 \rfloor$)mod4=(i+2t+$\lfloor 2 t/2 \rfloor$)mod4;

rearranging formula of signal Q becomes:

$x^k_{Qt}=x^i_{Qt}$, k=(i+2t+$\lfloor 2 t/Nt \rfloor$+1)mod Nt=(i+2t+$\lfloor 2 t/2 \rfloor$+1)mod4.

Figure 3:
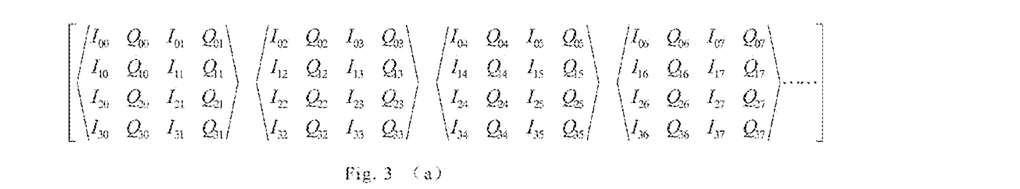
FIGS. 3(a) and 3(b) show a comparison of transmission matrixes before and after layered diagonal space interleaving.

Before rearranging, firstly information of signals I and Q of data on each antenna at each time is arranged on each antenna according reusing structure. As shown by FIG. 3(a) and for the convenience of illustrating space interleaving, ($I_{ij}$, $Q_{ij}$) represents in-phase components and the quadrature-phase components, where i represents position of the antenna, j represents sequence of point in time. For example, $I_{00}$ represents signal in path I at the first point of time on the first antenna. Effect after interleaving is shown by FIG. 3(b), which shows that each component after four-dimensional rotation modulation are scattered on four antennas after Interleaving respectively. Thus, for signals after multi-dimensional modulation, if the number of rotation modulation is equal to the number of transmitting antennas, all components by the D-dimensional rotation will be scattered and distributed on respective antennas.

Step (4) further includes following operation:

(41) Set symbol block vectors of all Nt transmitting antennas after layered space interleaving process in step (3) as the following; X={$x_0$, ... $x_i$, ... $x_{Nt-1}$}$^T$; in the formula, $x_i$ represents symbol block vector with length G on the $i^{th}$ transmitting antenna; natural number i represents sequence number of transmitting antenna, of which the value range is [0,Nt−3];

(42) Select a corresponding codebook according to the PMI obtained in step (1) and take the selected codebook as pre-coding matrix v; then multiply v by symbol block vector X to obtain symbol block 2 which is generated by the pre-coding process and has the same length as symbol block vector X, and Z=vX={$z_0$, ... $Z_i$, ... $Z_{Nt-1}$}$^T$; In the formula, $Z_i$ is the pre-coded symbol block vector on the $i^{th}$ antenna.

Step (5) further Includes following steps:

(51) set symbol block vectors received by all Nr receiving antennas at the receiving end as $y=\{y_0, \ldots y_j, \ldots, y_{Nt-1}\}^T$; in the formula, $y_j$ represents the symbol block vector received by the $j^{th}$ receiving antenna; j represents sequence number of receiving antenna, of which the value range is [0,Nr−1];

(52) pre-decode the obtained symbol block vector $y=\{y_0, \ldots y_j, \ldots, y_{Nr-1}\}^T$ to obtain pre-decoded signal.

Process of pre-coding in step (52) is as the following:

(521) the receiving end obtains channel response H according to the received pilot signal and obtains equivalent channel response Hv according to codebook collection V.

The embodiment of the present invention applies single-user double-stream signal codebook collection regulated in protocol 36.211.

$$V = \left\{ \begin{pmatrix} 1 & 0 \\ 0 & 1 \end{pmatrix}, \frac{1}{\sqrt{2}} \begin{pmatrix} 1 & 1 \\ 1 & -1 \end{pmatrix}, \frac{1}{\sqrt{2}} \begin{pmatrix} 1 & 1 \\ j & -j \end{pmatrix} \right\}$$

(522) compute a detection coefficient matrix $W^H=[(Hv)^H(Hv)+\sigma^2 I_{Nt}]^{-1}(Hv)^H$ according to the equivalent channel response Hv.

Thus obtaining signal $r_m$ which is the signal suffered MMSE process of the $m^{th}$ antenna.

$$r_m = a_{m0}x_0 + a_{m1}x_1 + \ldots + a_{mNt-1}x_{Nt-1} + b_{m0}n_0 + b_{m1}n_1 + \ldots + b_{mNr-1}n_{mNr-1} (0 \leq m \leq Nr-1)$$

In the formula, x represents a signal vector and $x=\{x_0, \ldots x_{Nt-1}\}$; n represents a zero-mean Gaussiasn random variable, squared error is $\sigma^2$, $a_{mn} \in A$, $A=W^H Hv$, A represents a Nt*Nt dimension matrix, $b_{mn} \in B$, $B=W^H$, B represents a Nt*Nr dimension matrix, $I_{Nt}$ represents Nt*Nt dimension unit matrix, the Nt is number of transmitting antennas and Nr is number of receiving antennas.

For a subcarrier of each frequency domain, its detection coefficient matrix can be calculated out, i.e. $W^H=[(Hv)^H(Hv)=\sigma^2 I_{Nt}]^{-1}(Hv)^H$; receiving signal is $y=Hvx+n$; x represents a signal vector and $x=\{x_0, \ldots x_{Nt-1}\}$; n represents a zero-mean Gaussiasn random variable; square error is $\sigma^2$, $y=\{y_0, \ldots y_{Nr-1}\}$. Multiply the received signal y by the detection matrix to obtain $r=W^H y=Ax+Bn$; $r=\{r_0 \ldots r_{Nt-1}\}$ is signal suffered MMSE process. In this case, $A=W^H Hv$, $B=W^H$, A Is a Nt*Nt dimension matrix; $a_{mn} \in A$; B is a Nt*Nr dimension matrix, $I_{Nt}$ is a Nt*Nt dimension unit matrix; $b_{mn} \in B$. For each subcarrier on the $m^{th}$ receiving antenna, signal after MMSE is ($0 \leq m \leq Nr-1$):

$$r_m = a_{m0}x_0 + a_{m1}x_1 + \ldots + a_{mNt-1}x_{Nt-1} + b_{m0}n_0 + b_{m1}n_1 + \ldots + b_{mNr-1}n_{mNr-1}.$$

(523) multiply by $a^*_{mn}/|a_{mn}|$ to perform phase compensation on signal $r_m$ suffered MMSE, and make the output signal is in form of $$r_m = |a_{mm}|x_m + (a^*_{mm}/|a_{mm}|)(a_{m0}x_0 + a_{m1}x_1 + \ldots + a_{m(m-1)}x_{m-1} + a_{m(m+1)}x_{m+1} + \ldots + a_{mNt-1}x_{Nt-1} + b_{m0}n_0 b_{m1}n_1 + \ldots b_{mNr-1}n_{mNr-1});$$

in the formula, a* represents conjugation of a, | | represents modulo operation, In the step, record $|a_{mm}|$ corresponding to signal $r_m$, of each subcarrier on each antenna as output $\lambda_m$ to obtain $\lambda=\{\lambda_0 \ldots \lambda_1 \ldots \lambda_{Nr-1}\}$. $\lambda_1$ represents a symbol block vector with length G on the $i^{th}$ transmitting antenna; $r=\{r_0 \ldots r_m \ldots r_{Nr-1}\}$ together with $\lambda=\{\lambda_0 \ldots \lambda_1 \ldots \lambda_{Nr-1}\}$ will undergo subsequent de-interleaving operation till enter a demodulator.

Step (6) further includes following operation steps:

(61) the receiving end firstly performs space de-interleaving on the pre-coded signals in path I or Q on all Nr receiving antennas; rearranging real part and imaginary part of the symbol block vectors on the receiving antenna respectively; The rule of rearranging includes setting the symbol block vector of the $j^{th}$ receiving antenna before rearranging to be $(x^j_{It}, x^j_{Qt})$, then signals of the real part and the imaginary part on the $k^{th}$ receiving antenna after rearranging satisfy following formula:

$$x^k_{It} = x^j_{It}, k=(j-2t-\lfloor 2 t/Nr \rfloor) \bmod Nr$$

$$x^k_{Qt} = x^j_{Qt}, k=(j-2t-\lfloor 2 t/Nr \rfloor -1) \bmod Nr;$$

in the above formula, mod represents modulo operation; $\lfloor \rfloor$ represents operation round down; $x^k_{It}$ represents signal of real part after de-interleaving; $x^k_{Qt}$ represents signal of imaginary part after de-interleaving.

(62) perform rotation demodulation process on symbol of each antenna by using maximum likelihood demodulation: take a rotation constellation diagram undergone fading channel as a demodulation referencing constellation diagram; by computing Euclidean distance between each symbol of the received data symbol and each constellation point in its modulating referencing constellation diagram, obtain log-likelihood ratios for decoding which are mapped as respective bits of each symbol;

(63) restore the data block symbol on each antenna to be bit information with code length of N and then perform decoding operation; select a corresponding decoding way according to the coding way and then use it to restore every group of user data block symbol on each antenna to be information hits wish K bit.

Figure 4:
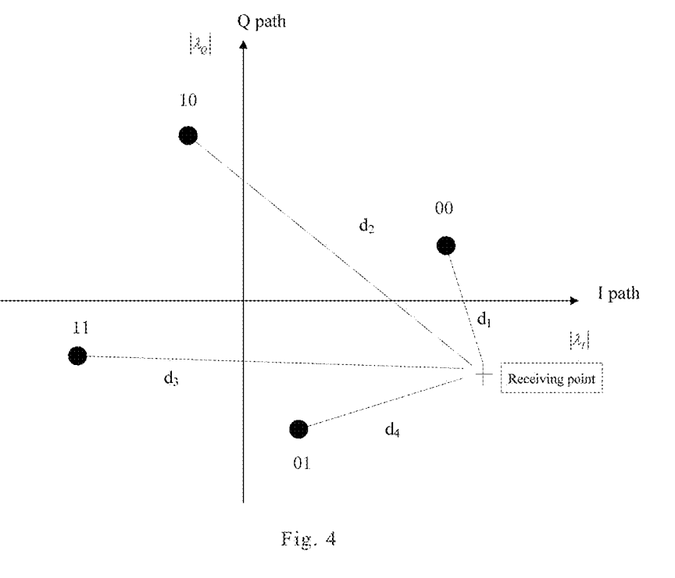
FIG. 4 shows a modulation constellation diagram of the present invention.

Referring to FIG. 4, a way of using rotation modulation constellation diagram and the constellation diagram formed by undergoing fading channel and a way of modulation thereof are introduced. In FIG. 4, signals in path I or Q received by each receiving antenna are affected by fading channel so as to generate different amplitude distortion. Set fading amplitude coefficients of path I and path Q to be $|\lambda_I|$ and $|\lambda_Q|$ respectively, $|\lambda_I|$ and $|\lambda_Q|$ are respectively fading coefficients of real part of signal and imaginary part of corresponding signal suffered respective de-interleavers of step (62); the way of its demodulation includes, at first, computing distances from a receiving point to respective constellation points, i.e. $d_1 \sim d_4$ shown in FIG. 4, and then compute log-likelihood ratio of each bit corresponding to the symbol. Exemplified by the first bit, if the first bit in the four constellation points is 0, then the bit combinations are 00 and 01, and their corresponding distances are represented by d1 and d4, and if the first bit in the four constellation points is 1, then the bit combinations are 10 and 11, their corresponding distances are represented by d2 and d3, therefore, the obtained log-likelihood ratio of the bit is $$\log \frac{\exp\left(-\frac{d_1^2}{2\sigma^2}\right) + \exp\left(-\frac{d_2^2}{2\sigma^2}\right)}{\exp\left(-\frac{d_3^2}{2\sigma^2}\right) + \exp\left(-\frac{d_4^2}{2\sigma^2}\right)}.$$

In the embodiment of the present invention, the data block symbol of each antenna is restored to be information with code length of 2304; Log-MAP algorithm is selected for decoding; when the code rate is 8/9. 2048 bit information is restored on each antenna; the whole process is completed.

From what is described above, the present invention provides a modulation method applies to, under condition of weak scattering related channel, joint optimizing for effectively combining channel code gain, space diversity and modulation diversity by combining multi-antenna codebook pre-coding and a rotation modulation solution via designing a new codebook selection rule. With the idea, any modification, which lacks inventiveness, made by those skilled In the art is regard to be fallen in the scope protected by the present invention.

The invention claimed is:

1. A multi-antenna codebook selection modulation method for solving weak scattering, comprising:
   (1) an equivalent channel response of downlink channel being obtained by transmitting pilot signal, a pre-coding matrix being selected according to the equivalent channel response, and a transmitting end obtaining a pre-coding matrix index (PMI);
   (2) the transmitting end allocating information with bit length K to each antenna according to requirements of code rate R and code length N of each antenna and performs coding modulation process on the information, then performing D-dimensional rotation modulation process on an in-phase component and a quadrature-phase component of a symbol, which is obtained by the coding modulation process, according to a preset rotation angle;
   (3) performing a layered space interleaving process on signal in path I or path Q on all Nt antennas after the D-dimensional rotation modulation process respectively;
   (4) the transmitting end selecting the pre-coding matrix according to the PMI obtained by step (1), and performing pre-coding operation on a symbol which is processed by the layered space interleaving process;
   (5) after receiving the data, the receiving end performing pre-decoding process on the data of the receiving end according to the equivalent channel response in step (1); and
   (6) the receiving end performing a layered space de-interleaving process on space signals in path I or path Q of pre-decoded data on Nr receiving antennas respectively; and performing rotation demodulation and decoding computing on data obtained by the layered space de-interleaving process on each receiving antenna so as to obtain required information; wherein
   D, Nr and Nt are natural numbers;
   the Nt is number of transmitting antennas and Nr is number of receiving antennas.

2. The method of claim 1, wherein Step (1) further comprises:
   (11a) the transmitting end transmitting pilot signal, and the receiving end obtaining channel response H according to the received pilot signal and obtaining the equivalent channel response Hv according to codebook collection V;
   (12a) calculating detection coefficient matrix $W^H=[(Hv)^H(Hv)+\sigma^2 I_{Nt}]^{-1}(Hv)^H$ according to the equivalent channel response Hv so as to obtain a signal of the $m^{th}$ antenna of the receiver end obtained by Minimum Mean Squared Error process:

$r_m = a_{m0}x_0 + a_{m1}x_1 + \ldots + a_{mNt-1}x_{Nt-1} + b_{m0}n_0 + b_{m1}n_1 + \ldots + b_{mNr-1}n_{mNr-1}$ $(0 \le m \le Nr-1)$, wherein x represents a signal vector and $x=\{x_0, \ldots x_{Nt-1}\}$, n represents a zero-mean Gaussian random variable, squared error is $\sigma^2$, $a_{mn} \in A$, $A = W^H Hv$, A represents a Nt*Nt dimension matrix, $b_{mn} \in B$, $B = W^H$, B represents a Nt*Nr dimension matrix, $I_{Nt}$ represents a Nt*Nt dimension unit matrix;

(13a) according to the signal $r_m$ of the $m^{th}$ antenna at the receiving end obtained by MMSE process in step (12a) the Signal to Interference plus Noise Ratio of each sub-carrier signal on the $m^{th}$ antenna at the receiving end being calculated out:

$$SINR_m = \frac{\|a_{mm}\|^2}{\sum_{i \ne m}^{N_t-1} \|a_{mi}\|^2 + \left(\sum_{j}^{N_r-1} \|b_{mj}\|^2\right) * \sigma^2};$$

(14a) according to $SINR_{im}$ of position of each sub-carrier, where $SINR_{im}$ represents corresponding Signal to Interference plus Noise Ratio when the $i^{th}$ codebook is selected on the $m^{th}$ antenna, calculating pre-coding matrix v, i.e.

$$v = \underset{v_i \in V}{\arg\max} \ \text{sum}(SINR_{i0}, SINR_{i1}, \ldots, SINR_{iNt-1})$$

$i = 1, 2, 3 \ldots$ where i represents codebook sequence number; and (15a) generating the pre-coding matrix index (PMI) according to the pre-coding matrix v and returning the PMI to the transmitting end.

3. The method of claim 1, wherein Step (1) further comprises:
   (11b) the receiving end transmitting uplink pilot detection signal, and thus the transmitting end obtaining uplink channel estimation response H*, and then obtaining downlink channel estimation response H, according to channel reciprocity and obtaining the equivalent channel response Hv according to codebook collection V;
   (12b) calculating detection coefficient matrix $W^H = [(Hv)^H(Hv)+\sigma^2 I_{Nt}]^{-1}(Hv)H$ according to the equivalent channel response Hv so as to obtain signal of the $m^{th}$ antenna of the receiving end obtained by Minimum Mean Squared Error (MMSE) process:

$r_m = a_{m0}x_0 + a_{m1}x_1 + \ldots + a_{mNt-1}x_{Nt-1} + b_{m0}n_0 + b_{m1}n_1 + \ldots + b_{mNr-1}n_{mNr-1}$ $(0 \le m \le Nr-1)$;

(13b) according to the signal $r_m$ of the $m^{th}$ antenna at the receiving end, obtained by MMSE process in step(12b), the Signal to Interference plus Noise Ratio of each sub-carrier signal on the $m^{th}$ antenna at the receiving end being calculated out:

$$SINR_m = \frac{\|a_{mm}\|^2}{\sum_{i \ne m}^{N_t-1} \|a_{mi}\|^2 + \left(\sum_{j}^{N_r-1} \|b_{mj}\|^2\right) * \sigma^2};$$

(14b) according to $SINR_{im}$ of position of each sub-carrier, where $SINR_{im}$ represents corresponding Signal to Interference plus Noise Ratio when the $i^{th}$ codebook is selected on the $m^{th}$ antenna, calculating pre-coding matrix v, i.e.

$$v = \underset{v_i \in V}{\operatorname{argmax}} \operatorname{sum}(SINR_{i0}, SINR_{i1}, \ldots, SINR_{iNt-1})$$

$$i = 1, 2, 3 \ldots,$$

i represents codebook sequence number; and (15b) the transmitting end generating a PMI according to pre-coding matrix v and stores the generated PMI.

4. The method of claim 1, wherein Step (3) further comprises:

(31) the transmitting end performing the layered space interleaving process on signals in I path on all Nt transmitting antennas, which includes rearranging positions of symbols after rotation modulation on all Nt transmitting antennas at each point in time according to a set rule, wherein the rule for rearranging is that if the symbol after rotation modulation in I path on the $i^{th}$ antenna at the point in time t before performing the layered space interleaving process is $x^i_{It}$, and the symbol after interleaving on the $k^{th}$ antenna at the point in time t after performing the layered space interleaving process is $x^k_{It}$, then $x^k_{It} = x^i_{It}$, $k = (i + 2t + \lfloor 2 \, t/Nt \rfloor) \bmod Nt$, wherein, natural numbers i and k are sequence numbers of transmitting antennas and the value range of both of i and k is [0,Nt−1], the value range of point in time t is 0,1, … G−1, G represents total number of symbols transmitted by each transmitting antenna, $\lfloor 2 \, t \rfloor$ represents operation round down, and mod represents modulo operation;

(32) the transmitting end performing the layered space interleaving process on symbols (signals) in Q path on all Nt transmitting antennas which includes rearranging positions of symbols after the rotation modulation in Q path on all Nt transmitting antennas at each one point in time according to a set rule, wherein the rule for rearranging is that if the symbol after the rotation modulation in Q path on the $i^{th}$ antenna at the point in time t before performing the layered space interleaving process is $x^i_{Qt}$, and the symbol after the layered space interleaving process on the $k^{th}$ antenna at the point in time t after performing the layered space interleaving process is $x^k_{Qt}$, then $x^k_{Qt} = x^i_{Qt}$, $k = (i + 2t + \lfloor 2 \, t/Nt \rfloor) \bmod Nt$; wherein, natural numbers i and k are sequence numbers of transmitting antennas and the value range of both of i and k is [0,Nt−1], the value range of time t is 0,1,…,G−1, G represents total number of symbols transmitted by each transmitting antenna, $\lfloor 2 \, t \rfloor$ represents operation round down, and mod represents modulo operation; and (33) record symbol block vectors of all Nt transmitting antennas interleaved in step (32) as $X = \{x_0, \ldots x_i, \ldots x_{Nt-i}\}^T$; wherein $x_i$ is a symbol block vector with length G on the $i^{th}$ transmitting antenna, natural number i is a sequence number of transmitting antenna, the value range of i is [0,Nt−1], and the number of transmitting antennas and the modulation dimension number can be set arbitrarily in principle, however, full diversity gain can be realized when the number of antennas Nt is equal to number of dimension D.

5. The method of claim 1, wherein Step (2) further comprises:

(21) calculating bit number on each antenna according to formula K=N×R;

(22) performing coding modulation on the K bits information on each antenna;

(23) performing D-dimensional rotation modulation process on the modulated symbol, which includes setting a rotation matrix RM, the signal vector after rotation modulation $x = (x_0, x_1, \ldots, x_{G-1})$, which satisfies $x = RM \times u$, wherein x is a signal vector after rotation modulation which includes G signals, and u is a signal vector before rotation; and (24) storing respective symbol block vectors obtained after performing rotation modulation.

6. The method of claim 1, wherein Step (4) further comprises:

(41) setting symbol block vectors of all Nt transmitting antennas after the layered space interleaving process in step (3) as the following: $X = \{x_0, \ldots x_i, \ldots x_{Nt-1}\}^T$, wherein $x_i$ represents symbol block vector with length G on the $i^{th}$ transmitting antenna, and the value range of i is [0,Nt−1]; and (42) selecting a corresponding codebook according to the PMI obtained in step (1) and taking the selected codebook as pre-coding matrix v; then multiplying v by symbol block vector X to obtain symbol block Z which is generated by the pre-coding process and has the same length as symbol block vector X, and $Z = vX = \{Z_0, \ldots Z_i, \ldots, Z_{Nt-1}\}^T$, wherein $Z_i$ is the pre-coded symbol block vector on the $i^{th}$ antenna.

7. The method of claim 1, wherein Step (5) further comprises:

(51) setting symbol block vectors received by all Nr receiving antennas at the receiving end as $y = \{y_0, \ldots y_j, \ldots y_{Nr-1}\}^T$, wherein $y_j$ represents the symbol block vector received by the $j^{th}$ receiving antenna, and j represents sequence number of receiving antenna, of which the value range is [0,Nr−1]; and (52) pre-decoding the obtained symbol block vector $y = \{y_0 y_j, \ldots, y_{Nr-1}\}^T$ to obtain pre-decoded signal.

8. The method of claim 7, wherein Step (52) further comprises:

(521) the receiving end obtaining channel response H according to the received pilot signal and obtaining said equivalent channel response Hv according to codebook collection V;

(522) computing a detection coefficient matrix $W^H$ according to the equivalent channel response Hv, wherein $W^H = [(Hv)^H(Hv) + \sigma^2 I_{Nt}]^{-1}(Hv)^H$; and (523) multiplying by $a^*_{mm}/|a_{mm}|$ to perform phase compensation on signal $r_m$ suffered MMSE, and make the output signal is in form of $r'_m = |a_{mm}|^x_m + (a^*_{mm}/|a_{mm}|)(a_{m0}X_0 + a_{m1}X_1 + \ldots + a_{m(m-1)}X_{m-1} + a_{m(m+1)}X_{m+1} + \ldots + a_{mNt-1}X_{Nt-1} + b_{m0}n_0 + b_{m1}n_1 + b_{mNr-1}n_{mNr-1})$;

wherein a* represents conjugation of a, | | represents modulo operation.

9. The method of claim 1, wherein Step (6) further comprises:

(61) the receiving end firstly performing space de-interleaving on the pre-coded signals in path I or Q on all Nr receiving antennas:

rearranging real part and imaginary part of the symbol block vectors on the receiving antenna respectively, wherein the rule of rearranging includes setting the symbol block vector of the $j^{th}$ receiving antenna before rearranging to be $(x^j_{It}, x^j_{Qt})$; and signals of the real part and the imaginary part on the $k^{th}$ receiving antenna after rearranging satisfying following formula:

$$x^k_{It} = x^j_{Ir}, k=(j-2t-\lfloor 2t/Nr \rfloor) \bmod Nr$$

$$x^k_{Qt} = x^j_{Qr}, k=(j-2t-\lfloor 2t/Nr \rfloor -1) \bmod Nr,$$

wherein, mod represents modulo operation, $\lfloor \cdot \rfloor$ represents operation round down $x^k_{It}$ represents signal of real part after de-interleaving, and $x^k_{Qt}$ represents signal of imaginary part after de-interleaving;

(62) performing rotation demodulation process on symbol of each antenna by using maximum likelihood demodulation, taking a rotation constellation diagram undergone fading channel as a demodulation referencing constellation diagram, and by computing Euclidean distance between each symbol of the received data symbol and each constellation point in its modulating referencing constellation diagram, obtaining log-likelihood ratios for decoding which are mapped as respective bits of each symbol; and (63) restoring the data block symbol on each antenna to be bit information with code length of N and then perform decoding operation, selecting a corresponding decoding way according to the coding way and then using it to restore every group of user data block symbol on each antenna to be information bits with K bit.

* * * * *